(12) United States Patent
Yamada et al.

(10) Patent No.: US 6,714,425 B2
(45) Date of Patent: Mar. 30, 2004

(54) POWER FACTOR CORRECTED SMPS WITH LIGHT AND HEAVY LOAD CONTROL MODES

(75) Inventors: Tomoyasu Yamada, Saitama (JP); Masaaki Shimada, Saitama (JP)

(73) Assignee: Sanken Electric Co., Ltd., Niiza (JP)

( * ) Notice: Subject to any disclaimer, the term of this patent is extended or adjusted under 35 U.S.C. 154(b) by 0 days.

(21) Appl. No.: 10/244,888

(22) Filed: Sep. 16, 2002

(65) Prior Publication Data
US 2003/0099119 A1 May 29, 2003

(30) Foreign Application Priority Data
Nov. 29, 2001 (JP) .................................... P2001-364379

(51) Int. Cl.⁷ .................................................. H02M 3/335
(52) U.S. Cl. ........................ 363/21.12; 363/37; 363/89; 363/97
(58) Field of Search .................... 363/20, 21.1, 21.12, 363/34, 37, 89, 95, 97

(56) References Cited

U.S. PATENT DOCUMENTS

| 5,726,871 | A | * | 3/1998 | Choi ............................ 363/89 |
|---|---|---|---|---|
| 5,793,623 | A | * | 8/1998 | Kawashima et al. .......... 363/37 |
| 5,856,917 | A | * | 1/1999 | Aonuma et al. .............. 363/89 |
| 6,344,986 | B1 | * | 2/2002 | Jain et al. ................. 363/21.12 |
| 6,507,507 | B2 | * | 1/2003 | Tokunaga et al. ............. 363/89 |
| 6,556,462 | B1 | * | 4/2003 | Steigerwald et al. .......... 363/89 |
| 6,600,670 | B2 | * | 7/2003 | Morita et al. ................. 363/97 |
| 6,621,236 | B1 | * | 9/2003 | Kisaichi ...................... 363/37 |
| 6,643,152 | B2 | * | 11/2003 | Tokunaga et al. ............. 363/89 |

\* cited by examiner

Primary Examiner—Jeffrey Sterrett
(74) Attorney, Agent, or Firm—Kilpatrick Stockton LLP

(57) ABSTRACT

In the switching power supply, a load state judgment circuit (25) judges the state of a load (20) according to a pulse signal VG to be used for ON/OFF control of a MOS transistor (8) as a switching element in a DC—DC converter (127). In order to reduce a power consumption of the switching power supply, a PFC ON/OFF switching circuit (24) stops the operation of the power factor improving converter (126) when the judgment result indicates a light load state, and starts the operation of the power factor improving converter (126) when the judgment result indicates a heavy load state.

9 Claims, 5 Drawing Sheets

POWER FACTOR CORRECTED SMPS WITH LIGHT AND HEAVY LOAD CONTROL MODES

CROSS-REFERENCE TO RELATED APPLICATION

This application is based upon and claims the benefit of priority from the prior Japanese Patent Application No.P2001-364379, filed on Nov. 29, 2001; the entire contents of which are incorporated herein by reference.

BACKGROUND OF THE INVENTION

1. Field of the Invention

The present invention relates to a switching power supply having a configuration in which a DC—DC converter is connected to an output side of a power factor improving converter, in particular, to a switching power supply capable of reducing its power consumption.

2. Description of the Related Art

Conventionally, switching power supplies are known, in which an alternating current power (AC) is converted to a direct current power (DC) by switching the operation and the obtained DC power is output to a load.

FIG. 1 is a circuit diagram showing a configuration of such a switching power supply according to a related art.

The switching power supply comprises a rectifier 2, a power factor improving converter 26 connected to the output side of the rectifier 2, a DC—DC converter 27 connected to the output side of the converter 26, and a controller 15. This controller 15, forming a part of both the converters 26 and 27, controls the operation of the power factor improving converter 26 and the DC—DC converter 27.

The rectifier 2 rectifies an AC voltage from an AC power source 1 and outputs the rectified voltage is supplied to the power factor improving converter 26. The converter 26 improves the power factor of the AC voltage including a ripple current and converts the rectified voltage to a DC voltage which is higher than the rectified AC voltage. The DC—DC converter 27 converts the DC voltage from the converter 26 to the converted DC voltage as the DC power for the load.

The controller 15 comprises a DC/DC controller 12 and a power factor controller (PFC) 13. The DC/DC controller 12 controls the operation of the DC—DC converter 27 and the PFC controller 13 controls the operation of the power factor improving converter 26.

Next, a description will be given of the operation of the switching power supply having the configuration described above.

The voltage rectified by the rectifier 2 is supplied to the DC—DC converter 27 through the power factor improving converter 26. When the voltage is supplied to the DC—DC converter 27, the voltage also supplied to both the DC/DC controller 12 and the PFC controller 13. This supply of the voltage starts up both the DC/DC controller 12 and the PFC controller 13.

The PFC controller 13 performs switching (ON/OFF) control for a first switching element 4 made up of a metal oxide semiconductor (MOS) transistor with a predetermined frequency in order to convert the voltage from the rectifier 2 to a DC voltage by increasing its voltage level.

That is, during ON period of the first switching element 4, a current flows through a reactor 3a, the energy stored in the reactor 3a during the OFF period of the first switching element 4 is supplied to and then charged in a smoothing capacitor 6 through a diode 5.

At this time, the PFC controller 13 performs the ON/OFF switching the operation of the first switching element 4 so that the current flowing through the first switching element 4 becomes the same phase of a sine wave of the AC voltage and the voltages between both terminals of the smoothing capacitor 6 becomes a constant value.

On the other hand, the DC/DC controller 12 performs the switching of a second switching element 8 made up of a MOS transistor in the DC—DC converter 27, for example, with a predetermined frequency, and supplies the power from a secondary winding 9b in a transformer 9 to a load 20. At this time, a voltage is induced in a thirdly winding 9c and the induced voltage is then smoothed by a diode 10 and a capacitor 11.

The smoothed voltage is supplied to both the DC/DC controller 12 and the PFC controller 13 as the power for the controller 15.

However, the power factor improving converter 26 connected to the DC—DC converter 27 in the switching power supply of a related art operates at light load for which no operation of the power factor improving converter is necessary. Accordingly, the power consumption of the switching power supply becomes increased in the light load state. Thus, the switching power supply of the related art involves a drawback that it is difficult to increase its power efficiency.

SUMMARY OF THE INVENTION

Accordingly, an object of the present invention is, with due consideration to the drawbacks of the technique of a related art, to provide a switching power supply capable of improving its power efficiency.

According to an embodiment, a switching power supply has a power factor improving converter, a DC—DC converter, and a control section. The power factor improving converter has a first switching element converting an alternating current (AC) voltage to a direct current (DC) voltage which is greater in voltage level than that of the AC voltage by performing a ON/OFF control for the first switching element. The DC—DC converter has a second switching element converting the DC voltage from the power factor improving converter to a DC voltage by performing a ON/OFF control for the second switching element. The control section judges a load state according to a pulse signal to be used for performing the ON/OFF control for the second switching element, and stops the operation of the power factor improving converter when the judgment result indicates a light load state, and starting the operation of the power factor improving converter when the judgment result indicates a heavy load state which is rather in load than the light load state.

According to another embodiment, the control section in the switching power supply has a load state judgment circuit and a power factor improving converter (PFC) ON/OFF switching circuit. The load state judgment circuit judges a load state according to the pulse signal to be used for performing the ON/OFF control for the second switching element. The power factor improving converter (PFC) ON/OFF switching circuit stops the operation of the power factor improving converter when the judgment result indicates a light load state, and starts the operation of the power factor improving converter when the judgment result indicates a heavy load state rather than the light load state.

In addition, according to another embodiment, the load state judgment circuit in the switching power supply has a reference period generation circuit and an ON period comparison circuit. The reference period generation circuit generates a first pulse signal of a first reference ON period according to the light load state and a second pulse signal of a second reference ON period, that is shorter in time than the first reference ON period of the first pulse signal, according to the heavy load state. The ON period comparison circuit compares one of the first reference ON period and the second reference ON period with an ON period of the pulse signal to be used for performing the ON/OFF operation of the second switching element, and switches the output of the reference period generation circuit from the second pulse signal of the second reference ON period to the first pulse signal of the first reference ON period when the judgment result indicates the current state of the load is the light load state.

Further, according to another embodiment, in the switching power supply, the ON period comparison circuit switches the output of the reference period generation circuit from the first pulse signal of the first reference ON period to the second pulse signal of the second reference ON period when the judgment result indicates the current state of the load is the heavy load state.

Moreover, according to another embodiment, the reference period generation circuit in the switching power supply has a hysteresis characteristic in which the reference period generation circuit outputs the first pulse signal of the first reference ON period when the ON period of the pulse signal to be used for switching the second switching element is shorter in time than the second reference ON period, and outputs the second pulse signal of the second reference ON period when the ON period of the pulse signal to be used for switching the second switching element is longer in time than the first reference ON period.

Still furthermore, according to another embodiment, the PFC ON/OFF switching circuit in the switching power supply stops the operation of the power factor improving converter during the light load state in order to reduce the magnitude of the current flowing through the power factor improving converter.

In addition, according to another embodiment, the load state judgment circuit in the switching power supply determines that the current state is the light load state when a power consumption of the load is not more than a high frequency wave control target power.

Moreover, according to another embodiment, the control section in the switching power supply controls that the ON period or the pulse signal to be used for switching the second switching element is decreased according to decreasing the load while keeping the output voltage of the switching power supply to a constant level.

The above and other features and advantages of this invention and the manner of realizing them will become more apparent, and the invention itself will best be understood, from a study of the following description and attached claims, with reference had to the attached drawings showing some preferable embodiments of the invention.

DESCRIPTION OF THE PREFERRED EMBODIMENTS

Other features of this invention will become apparent through the following description of various embodiments which are given for illustration and are not intended to be limiting thereof.

Figure 1:
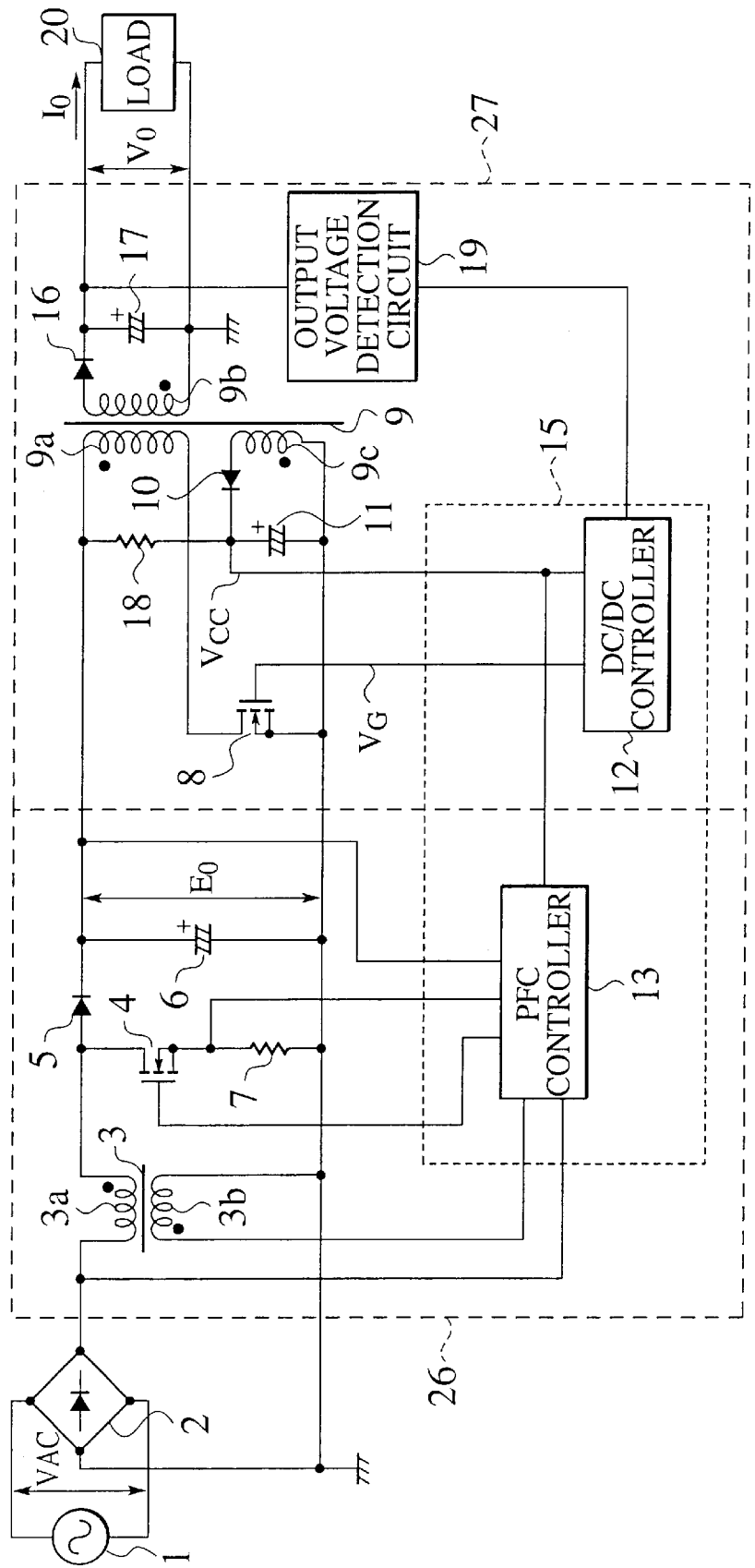
FIG. 1 is a circuit diagram showing a configuration of a switching power supply of a related art.

In the following description, the components in the following embodiments which are the same components explained in the description of the related art shown in FIG. 1 will be referred with the same reference characters and numbers.

First Embodiment

Figure 2:
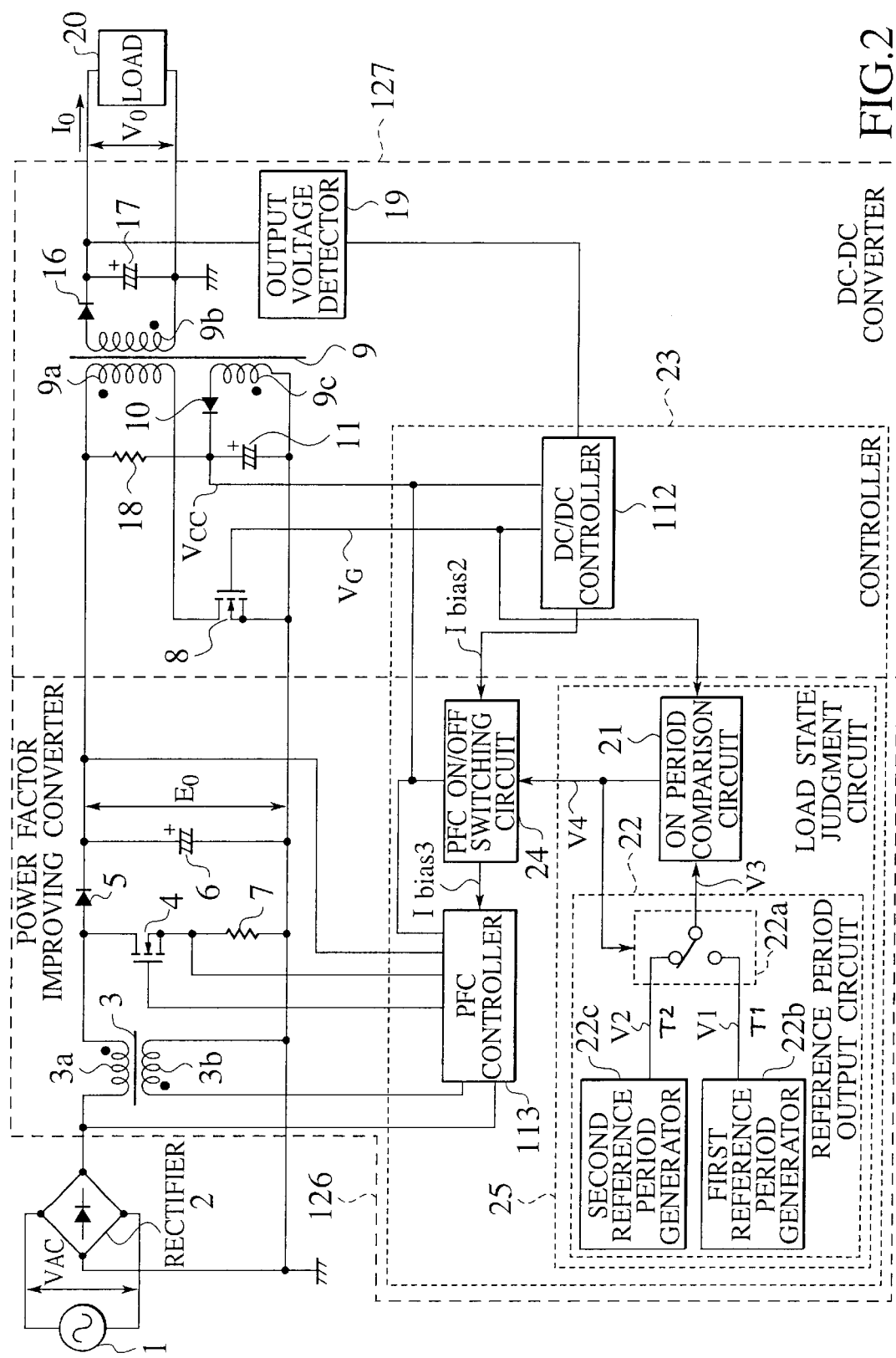
FIG. 2 is a circuit diagram showing a configuration of a switching power supply according to a first embodiment.

FIG. 2 is a circuit diagram showing a configuration of a switching power supply according to the first embodiment.

The switching power supply comprises a rectifier 2, a power factor improving converter 126 connected to the output side of the rectifier 2, a DC—DC converter 127 connected to the output side of the converter 126, and a controller 23 for controlling the operation of the converters 126 and 127. This controller 23 forms a part of both the converters 126 and 127.

The rectifier 2 rectifies an AC voltage supplied from the AC power supply 1, and the rectified voltage is supplied to the power factor improving converter 126. The power factor improving converter 126 improves the power factor of the AC voltage including a ripple current and converts the rectified voltage to a DC voltage which is higher than the rectified AC voltage. The DC—DC converter 127 converts the DC voltage from the converter 126 and supplies the converted DC voltage to the load 20 as a DC power.

The controller 23 comprises a DC—DC controller 112, a power factor controller (PFC) 113, a PFC ON/OFF switching circuit 24, and a load state judgment circuit 25. The DC—DC controller 112 controls the operation of the DC—DC converter 127. The PFC controller 13 controls the operation of the power factor improving converter 126. The load state judgment circuit 25 comprises a ON-period comparison circuit 21 and a reference period output circuit 22.

The reference period output circuit 22 comprises a switching element 22a, a first reference period generation circuit 22b, and a second reference period generation circuit 22c. The first reference period generation circuit 22b generates a pulse signal V1 of a first reference ON period T1. The second reference period generation circuit 222c generates a second reference ON period T2 which is shorter in time than the first reference ON period T1.

The switching element 22a selects one of the pulse signal V1 (transferred from the first reference period generation circuit 22b) and the second pulse signal V2 (transferred from the second reference period generation circuit 22c) according to a signal V4 transferred from the ON period comparison circuit 21, and then outputs the selected one as a pulse signal V3 to the ON period comparison circuit 21.

The ON period comparison circuit 21 compares the ON period of a pulse signal VG with the ON period of the pulse signal V3, where the pulse signal VG is supplied from the DC/DC controller 112 to a control terminal (for example, a gate) of a second switching element 8 (for example made up of a MOS transistor) in the DC—DC converter 127, and the pulse signal V3 is transferred from the reference period output circuit 22.

A signal V4 indicating the comparison result of the ON period comparison circuit 21 is supplied to the PFC ON/OFF switching circuit 24 and also to the switching element 22a, as described above.

The PFC ON/OFF switching circuit 24 starts or stops the operation of the PFC controller 113 according to the signal transferred V4 from the ON period comparison circuit 21. The above action thereby starts or stops the operation of the first switching element 4 (for example, made up of the MOS transistor).

In a concrete case, the PFC ON/OFF switching element 24 stops the operation of the PFC controller 113 and the ON/OFF operation of the first switching element 4 is thereby stopped when the ON period comparison circuit 21 outputs the signal V4 indicating that the ON period of the pulse signal VG is not more than the second reference ON period T2 of the pulse signal V3 from the reference period output circuit 22 after the comparison between the second reference ON period T2 of the pulse signal V3 from the reference period output circuit 22 and the ON period of the pulse signal VG from the DC/DC controller 112.

At this time, the reference period output circuit 22 switches to output the pulse signal V1 of the first reference ON period T1 from the pulse signal V2 of the second reference ON period T2.

When the ON period comparison circuit 21 outputs the signal V4 indicating that the ON period of the pulse signal VG is not less than the ON period of the first reference ON period T1 after the comparison between the first reference ON period T1 of the pulse signal V1 from the reference period output circuit 22 and the ON period of the pulse signal VG, the PFC ON/OFF switching circuit 24 starts the operation of the PFC controller 113 and the switching operation of the first switching element 4 is thereby initiated.

At this time, the reference period output circuit 22 switches the output of the pulse signal V2 from the pulse signal V1 of the first reference ON period T1 to the second reference ON period T2.

The DC/DC controller 112 controls so that the pulse width of the pulse signal VG for driving the second switching element 8 becomes narrow according to decreasing of the load while keeping the output voltage based on the detection result of the output voltage detection circuit 19 mounted at the output side of the DC—DC converter 127.

Figure 3:
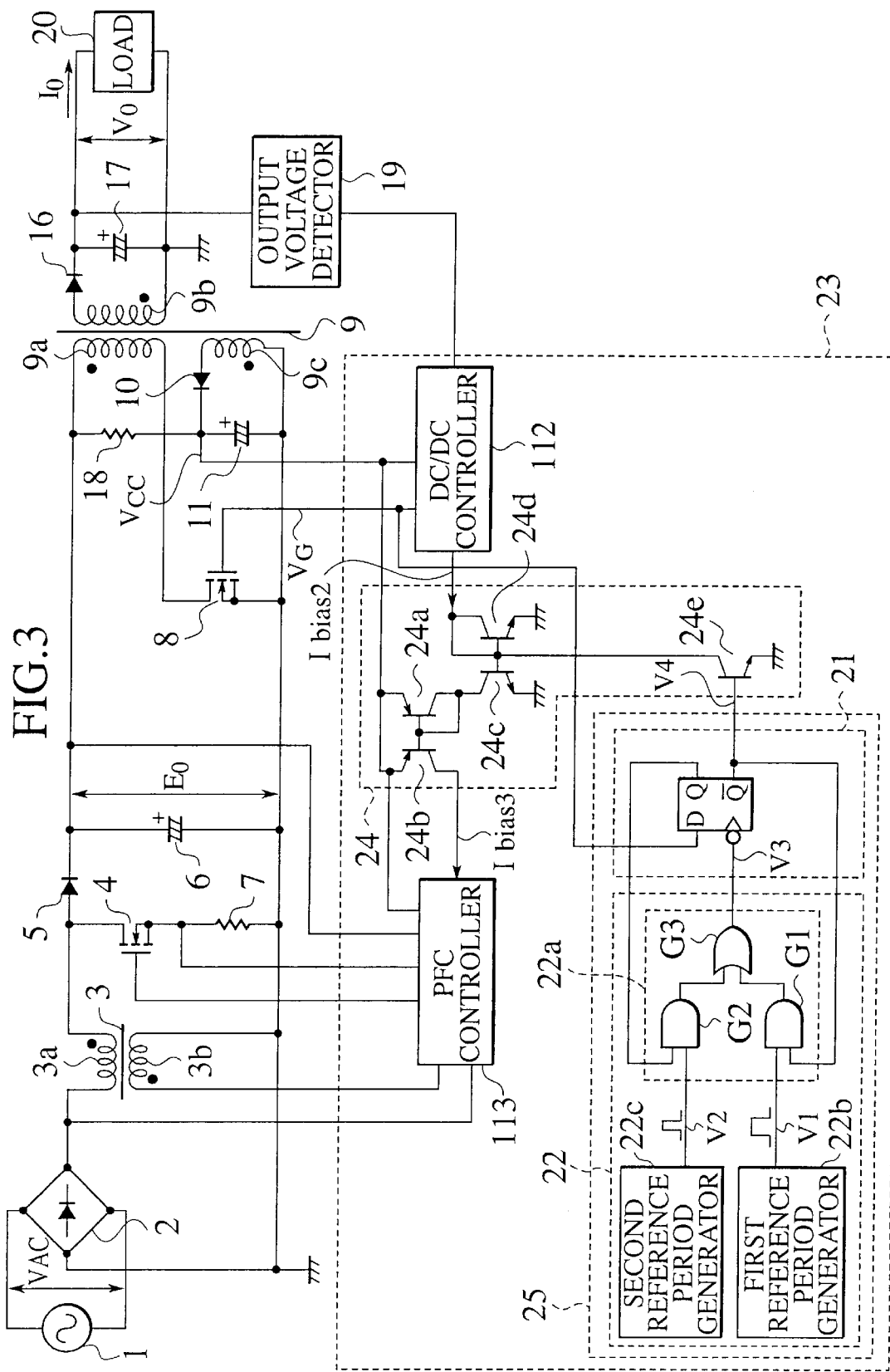
FIG. 3 is a circuit diagram showing a detailed configuration of a PFC ON/OFF switching circuit and a load state judgment circuit in the switching power supply shown in FIG. 2.

The control of the pulse width is performed by changing a threshold level of a sawtooth waveform signal, like a signal Vosc shown in FIG. 3, generated in the DC/DC controller 112 according to the magnitude of the load. The DC/DC controller 112 supplies the bias current Ibias2 to the PFC ON/OFF switching circuit 23.

Next, a description will be given of the explanation for a detailed configuration of the ON period comparison circuit 21, the reference period generation circuit 22, and the PFC ON/OFF switching circuit 24 with reference to FIG. 3.

The ON period comparison circuit 21 comprises a flip flop of a D type (a negative edge trigger type). The DC/DC controller 112 outputs the pulse signal VG to the data input terminal D of the flip flop. The switching element 22a outputs the pulse signal V3 to the clock input terminal of the flip flop. The inverse output terminal of the flip flop outputs the signal V4 to the PFC ON/OFF switching circuit 24.

By checking whether the ON period of the pulse signal VG from the DC/DC controller 112 is sampled at the falling edge of the pulse signal V3 from the switching element 22a in the reference period generation circuit 22, this flip flop forming the ON period comparison circuit 21 can judge whether or not the ON period of the pulse signal VG is longer in time than the ON period of the pulse signal V3, namely the first reference ON period of the pulse signal V1 or the second reference ON period of the pulse signal V2.

The switching element 22a is a selector of two inputs comprising an AND gate G1, an AND gate G2, and an OR gate G3.

One input terminal of the AND gate G1 inputs the signal from the inversed output /Q of the flip flop, the other terminal inputs the pulse signal V1 from the first reference period generation circuit 22b.

One input terminal of the AND gate G2 inputs the signal from the non-inversed output Q of the flip flop, the other terminal inputs the pulse signal V2 from the second reference period generation circuit 22c.

The OR gate G3 executes the logical sum between the outputs of the AND gates G1 and G2, and then outputs the pulse signal V3 as the result to the clock input terminal of the flip flop forming the ON period comparison circuit 21.

Accordingly, when the flip flop is reset, the flip flop selects and inputs the pulse signal V1, and when it is set, the flip flop selects and inputs the pulse signal V2. The selected one is transferred to the clock input terminal of the flip flop.

Bt this configuration of the load state judgment circuit 25, the ON period is sampled and the flip flop is set when the ON period of the pulse signal VG is longer in time than the pulse signal V1 or V2 under the heavy load state where the power consumption of the load is greater than a high frequency wave control target power (not less than a predetermined power). This state is continued unless the ON period of the pulse signal VG becomes shorter.

On the other hand, when the ON period of the pulse signal VG becomes shorter, for example, when the load state is shifted from the heavy load state to the light load state where the power consumption of the load is not more than the high frequency wave control target power, the flip flop is reset because the ON period comparison circuit 21 can not sample the ON period of the pulse signal VG. This state is kept unless the ON period of the pulse signal VG becomes longer in time. The signal V4 is thereby switched to Low level (hereinafter, referred to as L level) under the heavy load state. The signal V4 is switched to High level (hereinafter, referred to as H level) under the light load state.

As shown in FIG. 3, the PFC ON/OFF switching circuit 24 comprises a current mirror circuit made up of both transistors 24a and 24b, a current mirror circuit made up of both transistors 24c and 24d, and a transistor 24e.

When the signal V4 becomes L level in the heavy load state, the transistor 24e is turned OFF. Thereby the bias current Ibias2 from the DC/DC controller 112 flows through the transistor 24d, and the same current flows through both the transistors 24a and 24c, and further flows through the transistor 24b. This current flows as the bias current Ibias3 from the PFC ON/OFF switching circuit 24 to the PFC ON/OFF controller 113.

On the other hand, when the signal V4 becomes L level under the light load state, the transistor 24e in the PFC ON/OFF switching circuit 24 is turned ON. Thereby, the supply of the bias current Ibias2 to the PFC ON/OFF switching circuit 24 from the DC/DC controller 112 is stopped, and the supply of the bias current Ibias3 to the PFC controller 113 from the PFC ON/OFF switching circuit 24 is also stopped. That is, the supply of the voltage, rectified and then smoothed by a diode 10 and a capacitor 11 (which will be explained later), to the PFC controller 113 is stopped. The operation of the power factor improving converter 126 is thereby stopped.

In other words, during the light load state, the power factor improving converter 126 halts, and it is so controlled that the current of the PFC controller 113 is decreased. As a result, the power consumption can be decreased in the light load state.

Next, a description will be given of the explanation of the operation of the switching power supply having the above configuration with reference to FIG. 2 and FIG. 3.

The voltage rectified by the rectifier 2 is supplied to the DC—DC converter 127 through the power factor improving converter 126. When the voltage is supplied to the DC—DC converter 127, the voltage is supplied to the DC/DC controller 112 and the PFC ON/OFF switching circuit 24 in the controller 23 through the starting resistance 18. The operation of both the DC/DC controller 112 and the PFC ON/OFF switching circuit 24 are thereby initiated.

The PFC controller 113 whose operation is started by receiving the bias current Ibias3 from the PFC ON/OFF switching circuit 24 switches (ON/OFF) the operation of the first switching element 4 in the power factor improving converter 126 by a predetermined frequency in order to convert the voltage from the rectifier 2 to the direct current by rising in level the voltage from the rectifier 2. That is, the current flows through the reactor 3a during ON period of the first switching element 4, and the stored energy in the reactor 3a is charged to the smoothing capacitor 6 through the diode 5 during OFF period.

At this time, the PFC controller 113 switches the operation of the first switching element 4 so that the current flowing through the first switching element 4 has a same phase of the sine curve of the AC voltage VAC and both the terminals of the smoothing capacitor 6 has a same voltage level.

On the other hand, the DC/DC controller 112 switches the operation of the second switching element 8 in the DC—DC converter 127 with a predetermined frequency and the power is thereby supplied to the load through the secondary winding 9b in the transformer 9. At the same time, the voltage is induced in the thirdly winding 9c and then smoothed through the diode 10 and the capacitor 11. This rectified and smoothed voltage is supplied, as the power source for the controller 23, to both the DC/DC controller 112 and the PFC ON/OFF switching circuit 24.

Next, a description will be given of the detailed operation for the start and stop operation of the power factor improving converter 126 with reference to the timing chart shown in FIG. 4.

Figure 4:
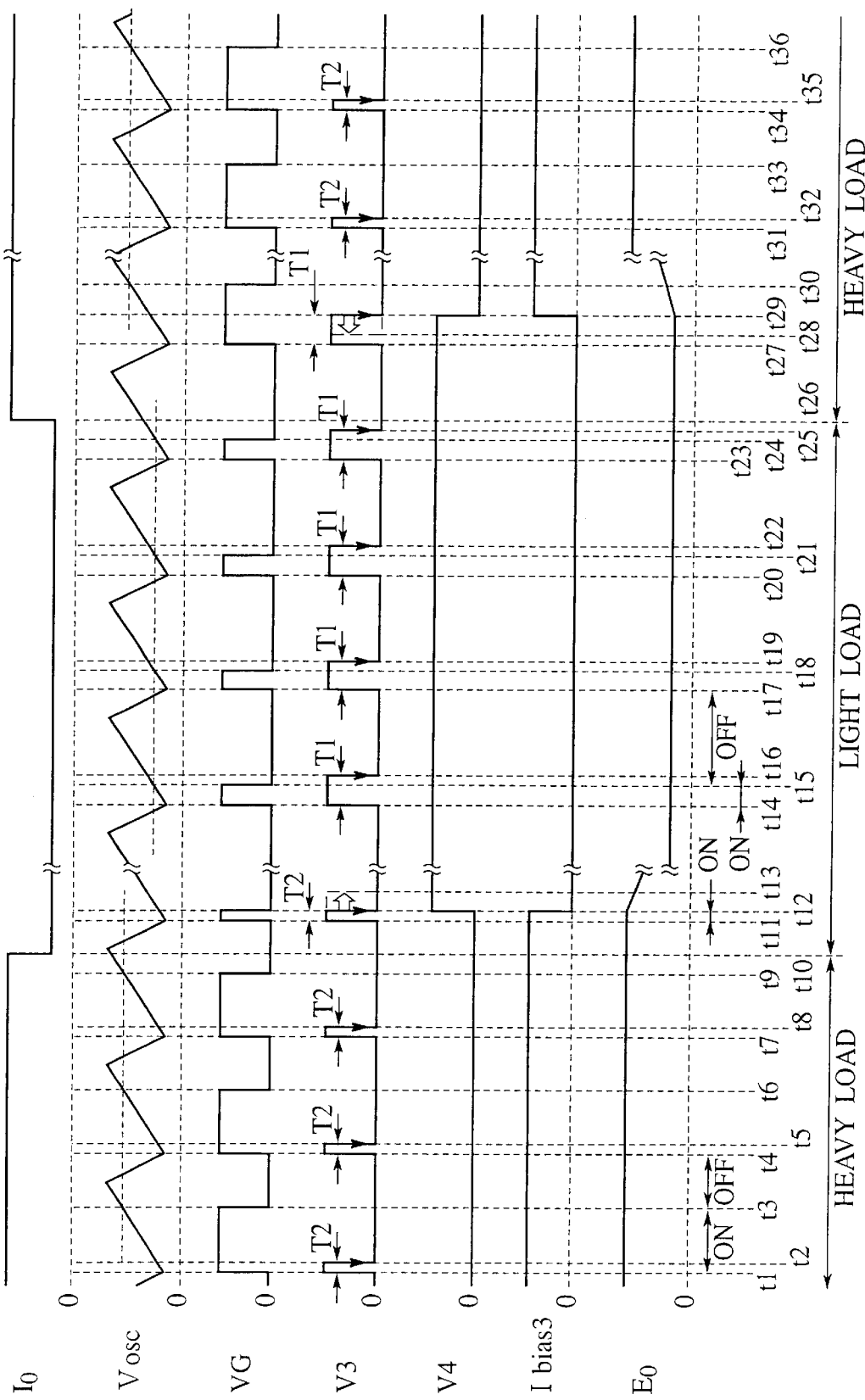
FIG. 4 is a timing chart showing operation of the switching power supply according to the first embodiment shown in FIG. 2.

Although not shown in the timing chart of FIG. 4, the ON period comparison circuit 21 is so controlled that no comparison operation is executed until the DC—DC converter 127 outputs a constant voltage after entering ON the power supply.

Under the state where the DC—DC converter 127 outputs a constant voltage, when the heavy load state of the DC—DC converter 127 is switched to the light load state, and when the ON period (t11 to t12) of the pulse signal VG supplied to the control terminal of the second switching element 8 is below in time the second reference ON period T2 of the pulse signal V3 transferred from the reference period output circuit 22, the ON period comparison circuit 21 outputs the signal V4 of H level from L level.

When the level of the signal V4 is shifted from of L level to H level, the transistor 24e in the PFC ON/OFF switching circuit 24 enters ON, so that the bias current Ibias2 is not propagated to the PFC controller 113 as the bias current Ibias3 from the PFC ON/OFF switching circuit 24. In this case, the magnitude of the bias current Ibias3 becomes zero, namely no bias current Ibias3 flows. As a result, the operation of the PFC controller 113 is stopped and the operation of the first switching element 4 is thereby stopped.

When the operation of the first switching element 4 is stopped, the output of the power factor improving converter 126 is not risen. In other words, the input voltage of the DC—DC converter 127 is decreased. As shown in the periods t14–t15, t17–t18, t20–t21, and t23–t24 in FIG. 4, the power factor improving converter 126 operates under the state in which the ON period of the pulse signal VG is longer than that of the ON period t11–t12 even if the light load state is continuously kept.

At this time, when the pulse signal V3 from the reference period output circuit 22 keeps the second reference ON period T2, the first switching element 4 restarts immediately following the ON period of the pulse signal VG becomes longer, and the first switching element 4 is stopped in the following ON period. Thus, the start and stop operation of the first switching element 4 is repeated alternately, and the first switching element 4 enters the unstable state. However, in this embodiment, because the pulse signal V3 that is output from the reference period output circuit 22 immediately following the stop of the operation of the first switching element 4, is switched to the first reference ON period T1 that is longer in time than that of the extended pulse signal VG, the first switching element 4 can continue the stop state.

Next, in a case where the load state of the DC—DC converter 127 is switched from the light load state to the heavy load state, the level of the output of the ON period comparison circuit 21 is switched from H level to L level when the ON period t27–t30 of the pulse signal VG input to the control terminal of the second switching element 8 is not less than the first reference ON period T1 output from the reference period output circuit 22.

As a result, the PFC ON/OFF switching circuit 24 outputs the current Ibias3, so that the operation of the PFC controller 113 starts, the first switching element 4 starts its switching operation. At the same time, because the pulse signal V3 output from the reference period output circuit 22 is switched to the second reference ON period T2 that is shorter in time than the first reference ON period T1, the first switching element 4 keeps a stable switching operation.

As described above, according to the switching power supply of the first embodiment, because it is so controlled that the power factor improving converter becomes the halt state during the light load state and the current flowing through the control circuits is decreased, it is possible to increase the power efficiency during the light load state.

Furthermore, in the switching operation of the power factor improving converter 126 into the start mode or the stop mode according to the magnitude of the load, it is so performed that the switching of both the first and second reference ON periods (that are compared with the ON period of the signal VG outputted from the DC—DC converter 127) becomes the period of hysteresis operation. That is, it is so switched that the reference period output circuit 22 outputs the pulse signal V1 of the first reference ON period T1 when the ON period of the pulse signal VG for switching the second switching element 8 is shorter in time than the second reference ON period T2, and the reference period output circuit 22 outputs the pulse signal V2 of the second reference ON period T2 when the ON period of the pulse signal VG is longer in time than the first reference ON period T1. It is thereby possible to switch the start and stop modes of the power factor improving converter 126 stably.

Second Embodiment

Figure 5:
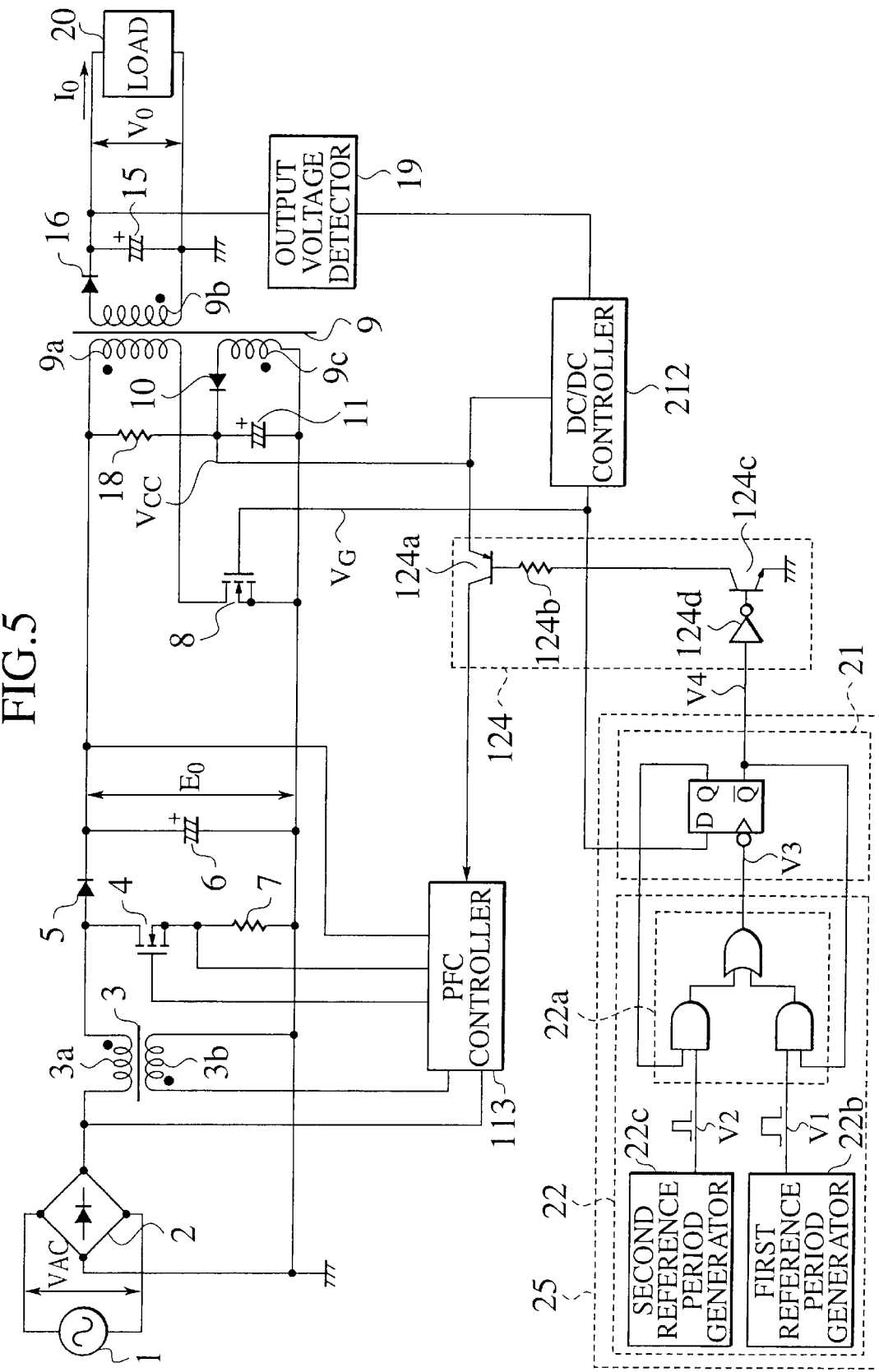
FIG. 5 is a circuit diagram showing a configuration of a switching power supply according to a second embodiment.

FIG. 5 is a circuit diagram showing a configuration of the switching power supply according to the second embodiment. When compared with the first embodiment, the switching power supply of the second embodiment has a PFC ON/OFF switching circuit 124 whose circuit configuration is different from that in the switching power supply of the first embodiment.

That is, the PFC ON/OFF switching circuit 124 comprises a transistor 124a, a resistance 124b, a transistor 124c, and an inverter 124d.

The transistor 124c in the PFC ON/OFF switching circuit 124 is turned ON when the level of the signal V4 becomes L level under the heavy load state. The ON state of the transistor 124c causes the transistor 124a becomes OFF. The power rectified and smoothed by the diode 10 and the capacitor 11 is not supplied to the PFC controller 113.

According to the switching power supply of the second embodiment, it is possible to form the PFC ON/OFF switching circuit 124 with a simple configuration. In addition, because it is not necessary that a DC/DC controller 212 outputs the bias current Ibias2, it is also possible to form the DC/DC controller 212 with a simple configuration.

The switching power supply of the present invention has following various modifications.

For example, the PFC controller and the DC/DC controller obtain the power through the DC—DC converter in the first and second embodiments. But, the present invention is not limited by this configuration, for example, it is possible to supply the power to them through difference power sources.

Furthermore, in order to detect the light load state, the ON-period of the control signal VG supplied from the DC—DC converter is used in the first and second embodiment described above. But, the present invention is not limited by this configuration, for example, it is possible to use the OFF-period of the control signal VG.

Moreover, it is also possible to use the DC—DC converter of a flyback type, forwarding type, and a resonance type.

In addition, it is also possible to form the switching elements in the power factor improving converter and the DC—DC converter using a bipolar transistor, IGBT and others in addition to MOS transistors As set forth in detail, according to the present invention, because the operation of the power factor improving converter halts during the light load state, it is possible to provide the switching power supply capable of improving the power efficiency.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. A switching power supply comprising:
   a power factor improving converter comprising a first switching element converting an alternating current (AC) voltage to a direct current (DC) voltage which is greater in voltage level than that of the AC voltage by performing a ON/OFF control for the first switching element;
   a DC—DC converter comprising a second switching element converting the DC voltage from the power factor improving converter to a DC voltage by performing a ON/OFF control for the second switching element; and
   a control section judging a load state according to a pulse signal to be used for performing the ON/OFF control for the second switching element, and stopping the operation of the power factor improving converter when the judgment result indicates a light load state, and starting the operation of the power factor improving converter when the judgment result indicates a heavy load state which is rather in load than the light load state.

2. The switching power supply according to claim 1, wherein
   the control section comprises:
   a load state judgment circuit judging a load state according to the pulse signal to be used for performing the ON/OFF control for the second switching element; and
   a power factor improving converter (PFC) ON/OFF switching circuit stopping the operation of the power factor improving converter when the judgment result indicates a light load state, and starting the operation of the power factor improving converter when the judgment result indicates a heavy load state rather than the light load state.

3. The switching power supply according to claim 2, wherein
   the load state judgment circuit comprises:
   a reference period generation circuit generating a first pulse signal of a first reference ON period according to the light load state and a second pulse signal of a second reference ON period, that is shorter in time than the first reference ON period of the first pulse signal, according to the heavy load state;
   an ON period comparison circuit comparing one of the first reference ON period and the second reference ON period with an ON period of the pulse signal to be used for performing the ON/OFF operation of the second switching element, and switching the output of the reference period generation circuit from the second pulse signal of the second reference ON period to the first pulse signal of the first reference ON period when the judgment result indicates the current state of the load is the light load state.

4. The switching power supply according to claim 3, wherein
   the ON period comparison circuit switches the output of the reference period generation circuit from the first pulse signal of the first reference ON period to the second pulse signal of the second reference ON period when the judgment result indicates the current state of the load is the heavy load state.

5. The switching power supply according to claim 4, wherein
   the load state judgment circuit determines that the current state is the light load state when a power consumption of the load is not more than a high frequency wave control target power.

6. The switching power supply according to claim 4, wherein
   the reference period generation circuit has a hysteresis characteristic in which the reference period generation circuit outputs the first pulse signal of the first reference ON period when the ON period of the third pulse signal to be used for switching the second switching element is shorter in time than the second reference ON period, and outputs the second pulse signal of the second reference ON period when the ON period or the pulse signal to be used for switching the second switching element is longer in time than the first reference ON period.

7. The switching power supply according to claim 3, wherein the PFC ON/OFF switching circuit stops the operation of the power factor improving converter during the light load state in order to reduce the magnitude of the current flowing through the power factor improving converter.

8. The switching power supply according to claim 3, wherein the reference period generation circuit has a hysteresis characteristic in which the reference period generation circuit outputs the first pulse signal of the first reference ON period when the ON period of the pulse signal to be used for switching the second switching element is shorter in time than the second reference ON period, and outputs the second pulse signal of the second reference ON period when the ON period of the pulse signal to be used for switching the second switching element is longer in time than the first reference ON period.

9. The switching power supply according to claim 1, wherein the control section controls that the ON period of the pulse signal to be used for switching the second switching element is decreased according to decreasing the load while keeping the output voltage of the switching power supply to a constant level.

* * * * *